(12) United States Patent
Dhillon

(10) Patent No.: US 7,489,927 B2
(45) Date of Patent: Feb. 10, 2009

(54) METHOD AND SYSTEM FOR OBJECT TRACKING AND COMMUNICATION

(75) Inventor: Harry S Dhillon, Morganville, NJ (US)

(73) Assignee: Alcatel-Lucent USA Inc., Murral Hill, NJ (US)

( * ) Notice: Subject to any disclaimer, the term of this patent is extended or adjusted under 35 U.S.C. 154(b) by 690 days.

(21) Appl. No.: 10/155,712

(22) Filed: May 24, 2002

(65) Prior Publication Data

US 2003/0220106 A1    Nov. 27, 2003

(51) Int. Cl.
*H04Q 7/20* (2006.01)
(52) U.S. Cl. .............. 455/430; 455/12.1; 455/13.1; 455/13.2; 455/17; 455/427; 455/428
(58) Field of Classification Search .......... 455/422, 455/432, 12, 450, 12.1, 13.2; 45/3.04; 342/352.01, 342/354; 201/213; 820/326
See application file for complete search history.

(56) References Cited

U.S. PATENT DOCUMENTS

| 5,161,248 | A | | 11/1992 | Bertiger et al. ............. 455/17 |
| 5,408,237 | A | | 4/1995 | Patterson et al. ........... 342/354 |
| 5,619,211 | A | * | 4/1997 | Horkin et al. .......... 342/357.17 |
| 5,790,954 | A | | 8/1998 | Tayloe et al. ................ 455/437 |
| 6,151,308 | A | * | 11/2000 | Ibanez-Meier et al. ...... 370/316 |
| 6,278,876 | B1 | | 8/2001 | Joshi et al. .................. 455/427 |
| 6,310,910 | B1 | * | 10/2001 | Shah et al. ................... 375/222 |
| 6,340,947 | B1 | * | 1/2002 | Chang et al. ............ 342/357.01 |
| 6,463,279 | B1 | * | 10/2002 | Sherman et al. ............. 455/427 |
| 6,543,723 | B1 | * | 4/2003 | Oh .......................... 244/158.5 |
| 2002/0003490 | A1 | * | 1/2002 | Chang et al. ............ 342/357.01 |
| 2003/0139135 | A1 | * | 7/2003 | Rossi ......................... 455/3.04 |
| 2003/0208317 | A1 | * | 11/2003 | Chang et al. ................ 701/213 |

* cited by examiner

*Primary Examiner*—David Q Nguyen

(57) ABSTRACT

A system and method for communicating between ground stations and mobile satellites effectively eliminates the need for transferring information from one ground station to another. Communication between a ground station and a mobile satellite is accomplished via an intermediate network of geosynchronous control satellites. The mobile satellite is positioned within a three-dimensional cellular grid formed by the network of geosynchronous satellites. This system is particularly applicable to a terrestrial network communicatively coupled to the geosynchronous network via one or more ground stations. The terrestrial network of ground stations no longer needs to perform expensive, time-consuming and manual synchronization and hand-off procedures. Instead, the position of a ground station antenna can remain fixed on one specific satellite in the geosynchronous network, while the mobile satellite is tracked by the geosynchronous network utilizing the three-dimensional cellular grid formed by intermediate control satellites.

8 Claims, 4 Drawing Sheets

METHOD AND SYSTEM FOR OBJECT TRACKING AND COMMUNICATION

FIELD OF THE INVENTION

The present invention relates generally to satellite tracking and communications and more specifically to utilizing cellular tracking and communication techniques in a three-dimensional grid to accomplish automated satellite tracking and communication.

BACKGROUND

Typically, communications with satellites in space is conducted utilizing ground stations containing radio antennas. Multiple stations are coordinated to maintain a link with a specific satellite according to the trace of its orbit around the Earth. Much of the synchronization and handing off of information from one earth station to another is accomplished via non-automatic means. This disadvantage is particularly acute in situations in which finite communication resources, e.g., ground stations, are multiplexed across multiple space missions, as is often the case.

SUMMARY

A need exists to reduce or eliminate the requirement to hand off information from ground station to ground station when communicating with satellites. In one embodiment, this need is met by a system and method for communicating between a ground station and a mobile satellite, which effectively eliminates the need for transferring information from one ground station to another ground station while maintaining communication with the mobile satellites. Communication between a ground station and a mobile satellite is accomplished via an intermediate network of geosynchronous satellites. The mobile satellite is positioned within a three-dimensional cellular grid formed by the network of geosynchronous satellites. As applied to a terrestrial network communicatively coupled to the geosynchronous network via one or more ground stations, the terrestrial network of ground stations no longer needs to perform expensive, time-consuming and manual synchronization and hand-off procedures. Instead, the position of a ground station antenna can remain fixed on one specific satellite in the geosynchronous network, while the mobile satellite is tracked by the geosynchronous network utilizing the three-dimensional cellular grid formed by intermediate control satellites.

DETAILED DESCRIPTION

Figure 1:
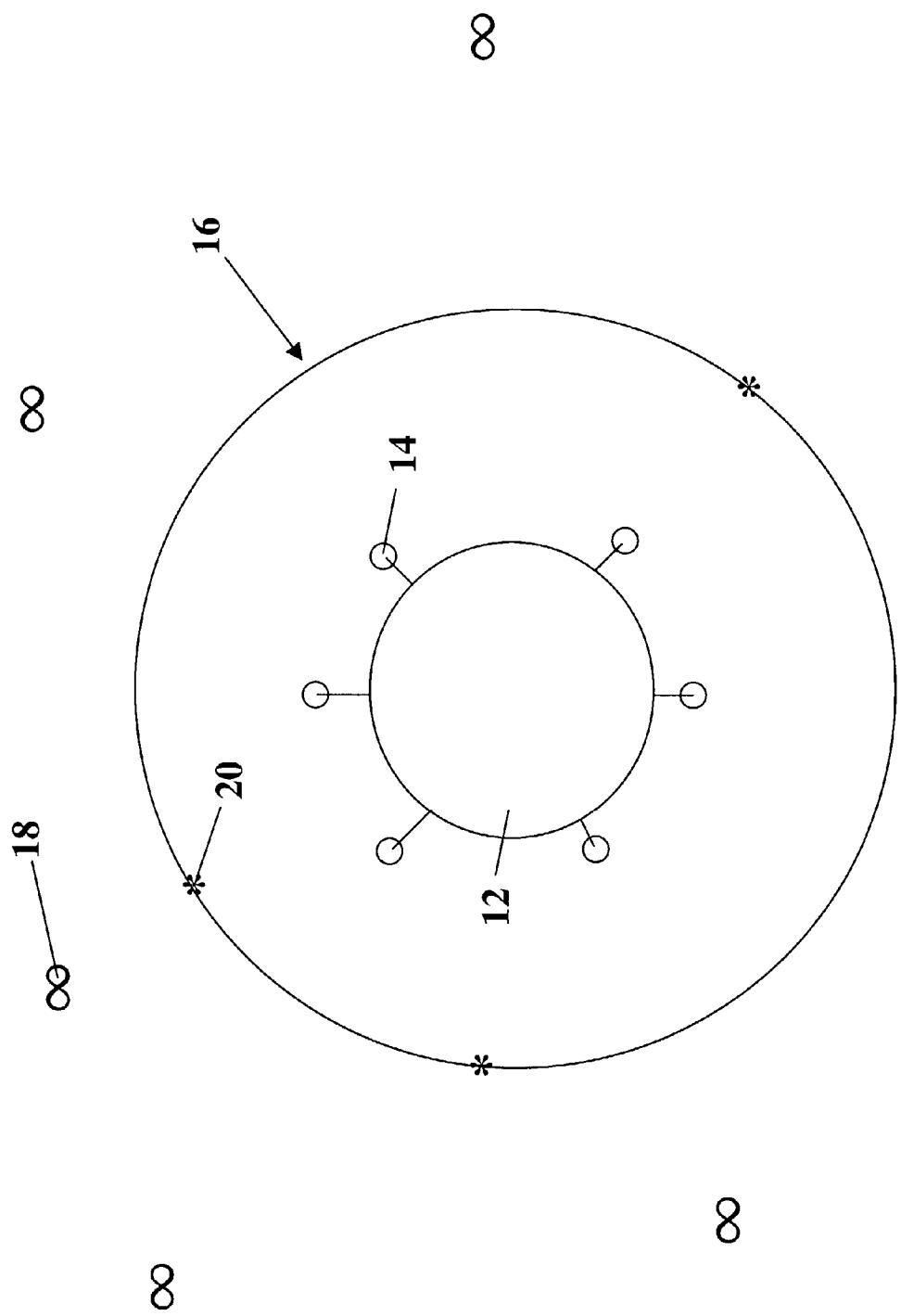
FIG. 1 is an illustration of a system for communicating with an object in accordance with an embodiment of the present invention.

A system for communicating between objects as shown in FIG. 1 includes at least one first object 14, at least one second object 18, and a network 16 of intermediate satellites 20. In an exemplary embodiment, and as described herein, the first objects 14 are ground stations located on Earth 12, the second objects 18 are satellites in space, and the intermediate network 16 is a geosynchronous network of individual (control) satellites 20 in geosynchronous orbit around Earth 12. However, various other embodiments are envisioned. For example, first objects 14 may be mobile, e.g., wireless communications devices on a motor vehicle or an aircraft. Also, second objects 18 may be man-made objects, e.g., spacecraft, natural bodies, e.g., asteroids, planets, moons, or other objects floating in space, which are either capable of communicating with the network 16, capable of being tracked, or any combination thereof. Further, body 12 may be a moon, planet, asteroid, a man-made body, or the like, having first objects 14 positioned thereon. Also, the network 16 of satellites 20 need not be in geosynchronous orbit, but may be in any controlled orbit around body 12, e.g., earth. For example, a controlled orbit of the network 16 may be achieved via periodic positional adjustments of the individual satellites 20.

A system as described herein provides the capability for a single ground station 14 to communicate with and/or track a satellite, or satellites 18, regardless of the position of the satellite(s) 18 in space. This is accomplished by communicating with the satellite(s) 18 via the geosynchronous network 16 of control satellites 20. A three-dimensional cellular grid is formed utilizing the geosynchronous network 16 of control satellites 20. Each control satellite 20 in the network 16 contains the necessary equipment to form multiple, controlled, electromagnetic beam patterns outward into space. Each pattern takes the shape of a slice of space that emulates a three-dimensional cell spike, hereinafter generally referred to as a cell. Each cell manages a unique subset of electromagnetic spectrum compared to adjacent cells, thereby minimizing interference between adjacent cells. The finite spectrum itself is divided into communications channels to be allocated and de-allocated on behalf of satellites entering and leaving a particular cell and requiring communications to a ground station or another satellite. The spectrum may be used to relay both control-plane data (signaling), user-plane data (user traffic), or any other forms of data.

Each satellite 18, located within this three-dimensional cellular grid, is in communication with the geosynchronous network 16 on a cell by cell basis. As a satellite 18 moves from one three-dimensional cell to an adjacent three-dimensional cell, communication with that satellite 18 is handed off from the current cell to the adjacent cell. A handoff is a procedure wherein communication resources managed by one or more cells (or control satellites 20) is transferred to one or more other cells (or control satellites 20), so as to retain an end-to-end communication capability between communicating endpoints. Thus, a hand-off within the grid may occur within the domain of a single satellite 20 (intra-satellite) or multiple satellites (inter-satellite). Although described as a three-dimensional grid, it is understood that the fourth dimension of time is inherent.

Handoff protocols and procedures may utilize the Internet Protocol (IP), Asynchronous Transfer Mode (ATM), other terrestrial protocol suites, or any portion/combination thereof, for basic transport (new protocols and procedures are formulated) or for mobility management (some or all of the mobility features inherent in those existing protocol suites are reused). A handoff can be initiated by a control satellite 20 in the network 16, by a satellite 18, or a combination of both. In addition, protocol-related information may be exchanged between control satellites in the network 16 using an inter-satellite link, based on radio, optical or other electromagnetic media.

Thus, regardless of the location of a satellite 18 within the three-dimensional cellular grid, it is always located in at least one three-dimensional cell, and thus always capable of communication with the geosynchronous network 16. The individual control satellites 20 are in communication with each other. Thus, a single ground station 14 may maintain communication with a single (or the same plurality of) satellite(s) 20, while communicating with satellites 18.

As depicted in FIG. 1, the intermediate network 16 of control satellites 20 is in a geosynchronous orbit around Earth 12. There exists an equatorial circular orbit around the Earth at a height of approximately 22,300 miles, known as the geosynchronous or geostationary orbit, whose rotational time period is equal to that of the rotation of the Earth around its axis 22 (See FIG. 2). Therefore, a satellite, such as satellite 20, placed in that orbit will appear stationary from the surface of the earth. Accordingly, control satellites in this geosynchronous orbit may maintain a communication link with a stationary ground station 14 at all times, thereby providing a stable tracking and communications network.

Figure 2:
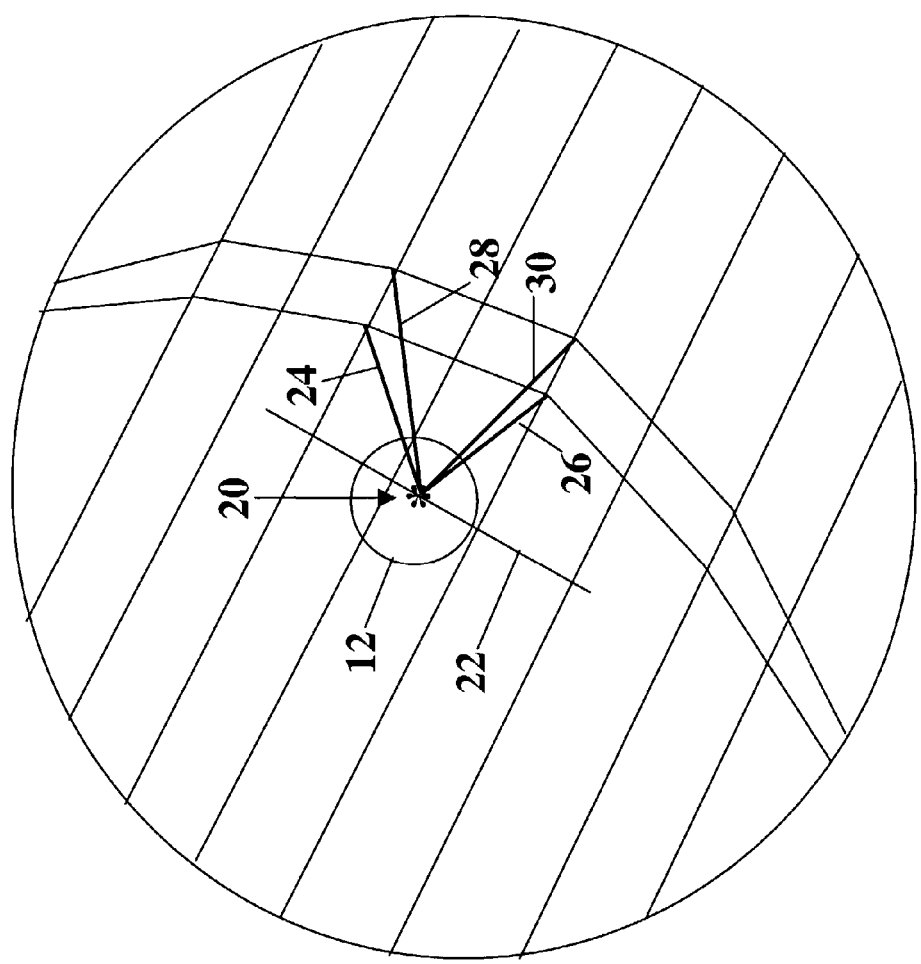
FIG. 2 is an illustration of a three-dimensional cellular grid in accordance with an embodiment of the present invention.

Utilizing the network 16 of satellites 20, a three-dimensional cellular grid is formed for communicating with satellites 18. In FIG. 2 is shown an exemplary three-dimensional cellular grid pattern resulting from a single satellite 20, formed radially outward from the Earth 12. The three-dimensional cell is defined, in part, by lines 24, 26, 28, and 30. Thus, the network 16 of satellites 20 forms a three-dimensional cellular grid pattern that completely surrounds the Earth. Each cell, as shown, allows communication with satellites 18 in near and far Earth orbits. The satellites 20 can be launched into a fixed orbit around the Earth 12 to form the geosynchronous network 16 for communicating with satellites 18. Advantageously, existing satellites 20 in a geosynchronous orbit about the Earth may be utilized. Thus, the geosynchronous network 16 may include a combination of satellites 20 specifically launched for communicating with satellites 18 and existing satellites 20 already in geosynchronous orbit about Earth. Various cellular communication techniques are known in the art and may be utilized to communicate with satellites 18. For example, adjacent cells may utilize different portions of the electromagnetic spectrum to avoid cross-talk and facilitate efficient hand off from cell to cell.

Figure 3:
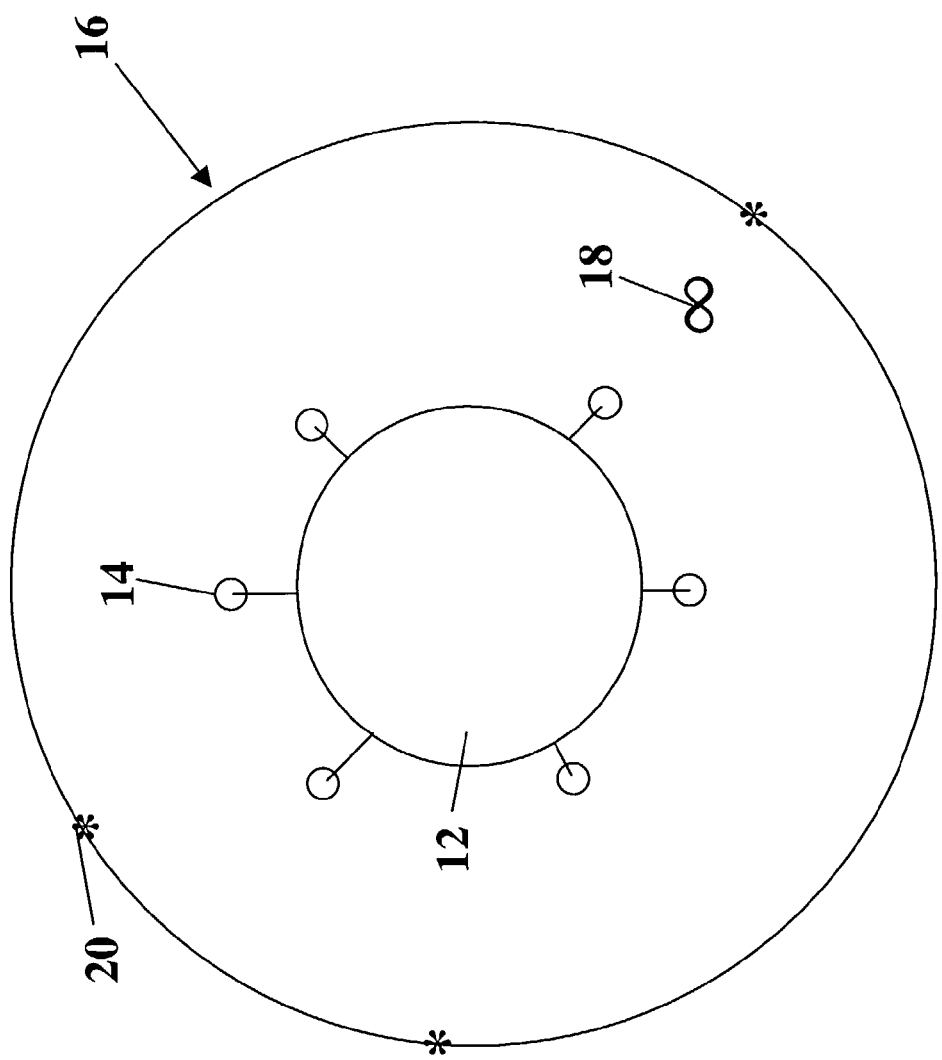
FIG. 3 is an illustration of a system for communicating with an object positioned between the earth and the network of satellites, in accordance with the present invention.

Communication with the objects 18 via the network 16 of satellites 20 may also be accomplished when the objects 18 are positioned between the Earth 12 and the network 16. FIG. 3 is an illustration of a system for communicating with an object 18 positioned between the Earth 12 and the network 16 of satellites 20, wherein a three-dimensional grid is formed radially inward from the network 16. The object 18, depicted in FIG. 3, may be an aircraft, a returning spacecraft, or any such object capable of communicating and/or being tracked. In order to communicate with the object 18, the network 16 is utilized to form a three-dimensional cellular grid that is formed radially inward from the network 16. As the object 18 travels from cell to cell, hand off procedures may be the same as previously described. Also, communication between the network 16 and the ground station 14 is as previously described. Thus, a system for communication between two objects, e.g., objects 14 and 18, as described herein, is applicable to scenarios in which the objects 18 are located radially outward from the network 16, radially inward from the network 16, or both. In the scenario in which objects 18 are located both radially inward and outward, the network 16 is utilized to form three-dimensional cellular grids in both the radially inward and outward directions.

The system for communication between objects as described herein is particularly applicable to a terrestrial network of ground stations 14 communicatively coupled to the network 16 via one or more ground stations 14. The terrestrial network of ground stations no longer needs to perform expensive and time consuming synchronization and handoff procedures. Instead, because the orbit of the control satellites 20 in the network 16 is fixed, e.g., geosynchronous, with respect to the Earth 12, the position of a ground station antenna can remain fixed on one specific control satellite 20 of the network 16. As a result, a portion of the electromagnetic spectrum previously utilized by the network 16 to communicate with other satellites 18 may be utilized to perform other control-plane functions, such as paging or hailing. For example, a satellite 18 may contain the appropriate means for listening to a paging/hailing channel and responding accordingly, e.g., over that same channel. Each satellite 18 may be associated with a unique identification means, such that a satellite 18 will respond only to a page having the appropriate identification means. When the location of a specific satellite 18 is desired, a page including the identification means for that specific satellite 18 may be sent out over the paging channel in all of the three-dimensional cells. The specific satellite 18, recognizing its identification means, may respond with its location, e.g., current cell, over the paging channel.

Figure 4:
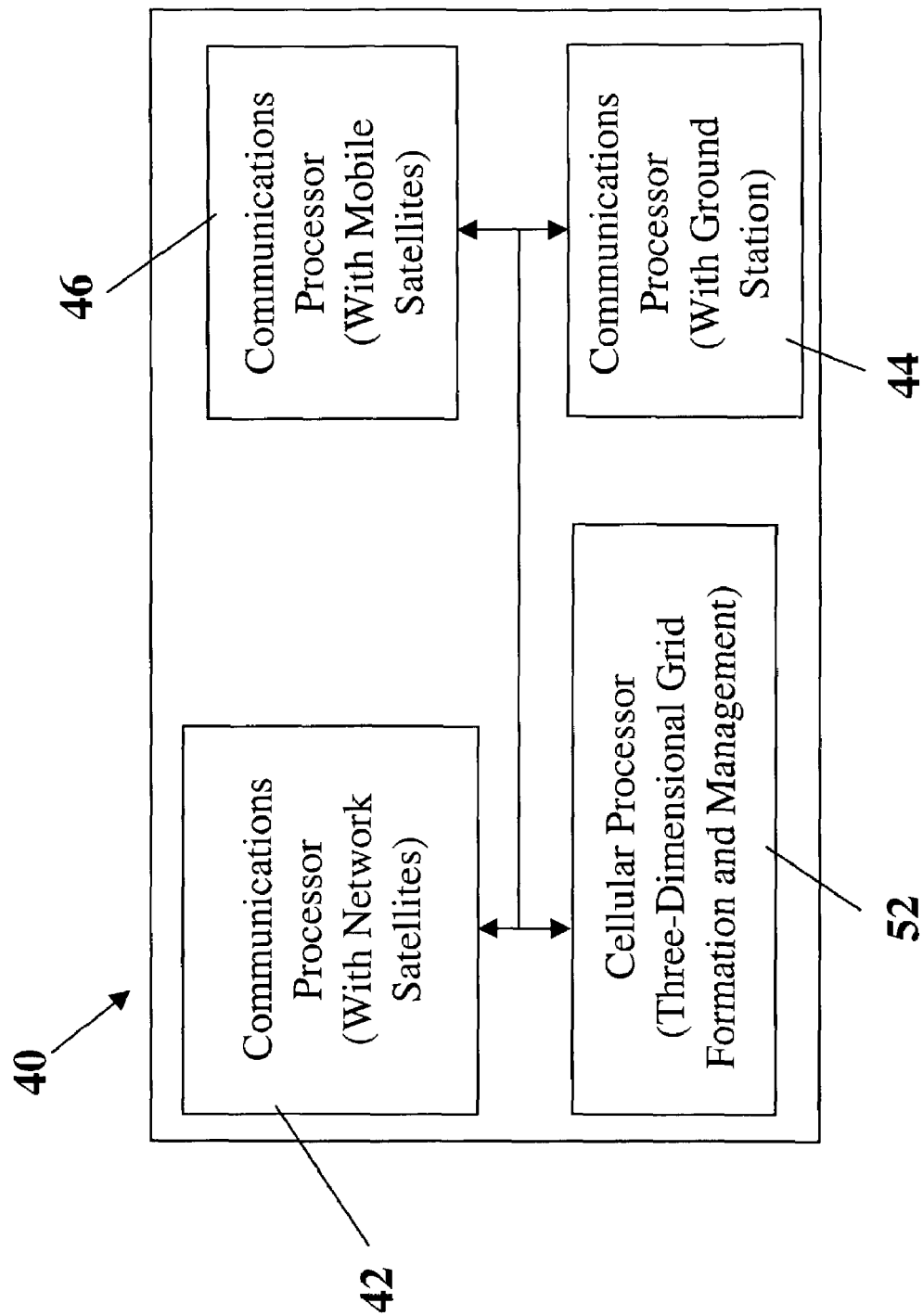
FIG. 4 is a function block diagram of an apparatus for facilitating communications between satellites and a ground station via an intermediate network of satellites.

In FIG. 4 is shown a function block diagram of an apparatus 40 for facilitating communications between satellites 18 and a ground station 14 via an intermediate network 16 of satellites 20. The apparatus 40 comprises a first communications processor 42, a second communications processor 44, a third communications processor 46, and a cellular processor 52. The first communications processor 42 processes a first signal indicative of communications with other satellites 20 in the network 16. The first signal may be a transmitted signal, a received signal, or a combination thereof. The second communications processor 44 processes a second signal indicative of communications with a ground station 14. The second signal may be a transmitted signal, a received signal, or a combination thereof. The third communications processor 46 processes a third signal indicative of the position of a satellite 18, communications with a satellite 18, or a combination thereof. The third signal may be a transmitted signal, a received signal, or a combination thereof. The apparatus 40 may process and format data in accordance with various protocols. In one embodiment, the apparatus routes and forwards packet-based data, e.g., packets based on the Internet Protocol, or any new packet specifications, represented in electronic, optical or opto-electronic form and routes and forwards circuit-based data (using telephony signaling, signaling based on virtual-circuit based data services, e.g., Frame Relay, Asynchronous Transfer Mode or Multiprotocol Label Switching, or any new signaling specifications), represented in electronic, optical or opto-electronic form. The cellular processor 52 forms the three-dimensional grid and performs tracking and communications channel management as satellite 18 is moving from a cell to an adjacent cell, between satellites 20, within the three dimensional cellular grid.

In one embodiment, the apparatus 14 is incorporated as part of at least one of the satellites 20 of the network 16. In this configuration, the apparatus is located such that it may receive and transmit signals from/to the satellites 18 and at least one other satellite 20 of the network 16. A received signal may be indicative of the location of a satellite, of communications with a satellites (or ground station), or a combination thereof. Each processor 42, 44, 46, and 52, comprises the required receiver and/or transmitter equipment to process the respective signals. For example, the communications processor 42 may include receiver and transmitter equipment enabling the apparatus 40 to transmit and receive signals at the appropriate frequencies, data rates, and bandwidths to facilitate communications with a other satellites 20 in the network 16. The communications processor 46 may include receiver and transmitter equipment enabling the apparatus 40 to transmit and receive signals at the appropriate frequencies, data rates, and bandwidths to facilitate communications with mobile satellites 18. The communications processor 44 may include receiver and transmitter equipment enabling the apparatus 40 to transmit and receive signals at the appropriate frequencies, data rates, and bandwidths to facilitate communications with a ground station 14.

The cellular processor 52 may form the three-dimensional cellular grid using known techniques. The cellular processor 52 utilizes hand off protocols and procedures, as previously described, to ensure that processing of signals is maintained as satellites 18 move from one cell to an adjacent cell within the three-dimensional grid. The cellular processor 52 may manage additional processors and/or arrays that form the cellular grid, and which maintain and manipulate radio, optical or other type of electromagnetic waves across a range of frequencies. Each of the processors 42, 44, 46, and 52, may include a general purpose processor, e.g., computer, a dedicated processor, software, or a combination thereof. In another embodiment, the apparatus 40 is in the form of a distributed architecture. Various functions are thus performed by code segments, processors, dedicated hardware, dedicated software, or a combination thereof.

Although illustrated and described herein with reference to certain specific embodiments, the system and method for communication between objects as described herein is nevertheless not intended to be limited to the details shown. Rather, various modifications may be made in the details within the scope and range of equivalents of the claims and without departing from the spirit of the invention. For example, details of the three-dimensional cell grid, such as its pattern, hierarchy and range, may vary. A grid does not have to map a complete 360-degree coverage pattern around a central body, e.g., the Earth. Instead, partial coverage may be provided over a particular orbital belt characterized by a range in the values of known orbital elements. Furthermore, communication is not limited to any particular portion of the electromagnetic spectrum. In another embodiment, the current location of any satellite is kept in a centralized, or distributed, data repository, e.g., database. As a communication channel needs to be established with a satellite, relevant Earth-based or space-based control-plane protocols query the database to get the most recent location of the satellite in order to accelerate establishment of a communication channel. The location of the database need not be limited. Thus the database may be ground-based, space-based, or any combination thereof. In yet another embodiment, a natural body, e.g., the Earth, contains the appropriate equipment to create a cellular grid similar to the constellation of satellites 16, as previously described herein. It is also envisioned that other natural bodies in space may create and maintain their own three-dimensional cell grid, and that interplanetary communications may be realized by enabling communications between grids.

What is claimed is:

1. A method for communicating with an object in space, said method comprising:
   communicating between a ground station and a first geosynchronous satellite of a plurality of geosynchronous satellites, wherein said ground station and said first geosynchronous satellite are in fixed communication and wherein each of said geosynchronous satellites is associated with a respective three-dimensional cell including the respective geosynchronous satellite and a respective surrounding region;
   communicating between said first geosynchronous satellite and a second geosynchronous satellite having associated with it a cell including said object by relaying messages between said first geosynchronous satellite and said second geosynchronous satellite; and
   communicating between said second geosynchronous satellite and said object;
   wherein a portion of the electromagnetic spectrum used by said geosynchronous satellites to communicate with said object is dedicated as a paging channel.

2. The method of claim 1, wherein said object listens to said paging channel, and a page is sent out on said paging channel in each three-dimensional cell.

3. The method of claim 2, wherein said object has a unique identification that allows said object to respond to said page on said paging channel.

4. A computer readable medium having embodied thereon a program for causing a processor to facilitate communication with an object in space, said program comprising means for causing said processor to facilitate communication between a ground station in fixed communication with a first geosynchronous satellite of a plurality of geosynchronous satellites, wherein each of said geosynchronous satellites is associated with a respective three-dimensional cell including each respective satellite and a respective surrounding region and communicating between said ground station and said object by relaying messages between said first geosynchronous satellite and another geosynchronous satellite having associated with it a three-dimensional cell including said object; and
   wherein a portion of the electromagnetic spectrum used by said geosynchronous satellites to communicate with said object is dedicated as a paging channel.

5. The computer readable medium of claim 4, wherein:
   said object listens to said paging channel, and a page is sent out on said paging channel in each three-dimensional cell; and
   said object has a unique identification that allows said object to respond to said page on said paging channel.

6. A system for communicating with an object in space, said system comprising:
   a ground station in fixed communication with a first geosynchronous satellite of a plurality of geosynchronous satellites, each of said geosynchronous satellites being associated with a respective three-dimensional cell including each respective geosynchronous satellite and a respective surrounding region, wherein at least one object within a three dimensional cell is adapted to communicate with the respective geosynchronous satellite, said system being adapted to maintain communication between said first ground station and said at least one object moving from said first geosynchronous satellite's three-dimensional cell by relaying messages between said first satellite and a satellite associated with another three-dimensional cell including said object;
   wherein a portion of the electromagnetic spectrum used by said geosynchronous satellites to communicate with said object is dedicated as a paging channel.

7. The system of claim 6, wherein said object listens to said paging channel, and a page is sent out on said paging channel in each three-dimensional cell.

8. The system of claim 7, wherein said object has a unique identification that allows said object to respond to said page on said paging channel.

* * * * *